April 17, 1962 L. R. KAHN 3,030,503

DIVERSITY RECEIVING SYSTEM

Original Filed July 3, 1953 5 Sheets-Sheet 1

INVENTOR.
LEONARD R. KAHN
BY Mathis and Graybeal
ATTORNEYS

April 17, 1962 L. R. KAHN 3,030,503

DIVERSITY RECEIVING SYSTEM

Original Filed July 3, 1953 5 Sheets-Sheet 2

INVENTOR.
LEONARD R. KAHN
BY Mathis and Graybeal
ATTORNEYS

April 17, 1962 L. R. KAHN 3,030,503

DIVERSITY RECEIVING SYSTEM

Original Filed July 3, 1953 5 Sheets-Sheet 3

INVENTOR.
LEONARD R. KAHN
BY Mathis and Graybeal
ATTORNEYS

April 17, 1962

L. R. KAHN 3,030,503

DIVERSITY RECEIVING SYSTEM

Original Filed July 3, 1953

5 Sheets-Sheet 4

INVENTOR.
LEONARD R. KAHN

BY Mathis and Graybeal

ATTORNEYS

April 17, 1962 L. R. KAHN 3,030,503

DIVERSITY RECEIVING SYSTEM

Original Filed July 3, 1953 5 Sheets-Sheet 5

INVENTOR.
LEONARD R. KAHN

BY Mathis and Graybeal
ATTORNEYS

United States Patent Office 3,030,503

Patented Apr. 17, 1962

3,030,503

DIVERSITY RECEIVING SYSTEM

Leonard R. Kahn, Freeport, N.Y., assignor, by mesne assignments, to Kahn Research Laboratories, Inc., Freeport, N.Y.

Continuation of application Ser. No. 365,964, July 3, 1953. This application Dec. 13, 1960, Ser. No. 75,540
16 Claims. (Cl. 250—20)

This invention relates to diversity receiving systems of the type in which a signal improvement is effected by using or by choosing the outputs of several receivers, either connected to spaced antennas, or receiving signals transmitted on different transmission frequencies. Such systems are commonly called either "space diversity" systems in which several antennas are geographically spaced and connected to separate receivers, or "frequency diversity" systems in which signals are combined which have been transmitted on different frequencies in the radio spectrum.

The general object of the present invention is to improve such systems. A primary object of the invention is to provide a method of combining diversity signals in such a manner as to obtain optimum signal-to-noise ratio at all times.

Another object is to combine the signals in such a manner as to make signal cancellation impossible.

A further object is to provide a system which can be used to combine any number of diversity signals.

To accomplish the foregoing general objects, and other more specific objects which will hereinafter appear, my invention resides in the method steps and circuit elements more particularly described in the following specification. The specification is accompanied by drawings, in which.

Figure 1:
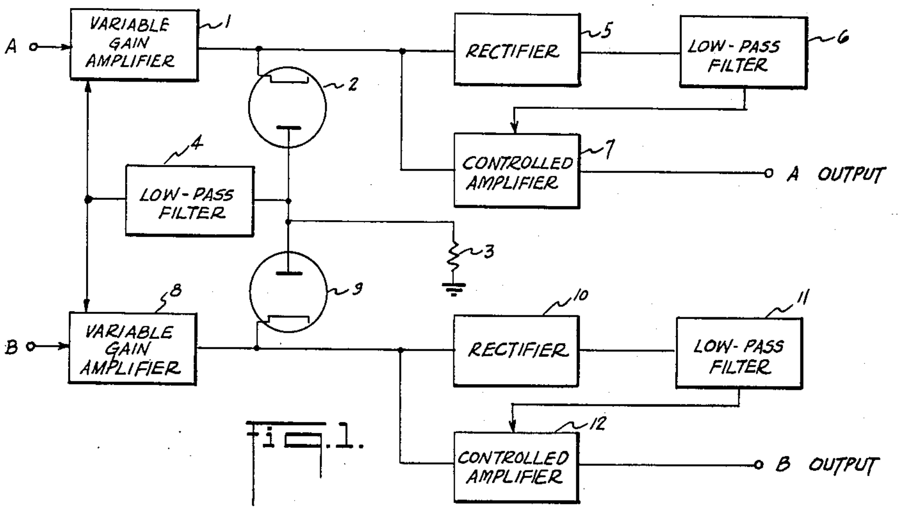
FIG. 1 is a simplified block diagram showing my invention applied to a two channel diversity system.

In the prior art of diversity combining systems, various selector devices were incorporated which had the general objective of choosing the best signal of the several which were being received. These systems have disadvantages, including, for example, the possibility of switching transients or cancellation conditions in which two or more signals may combine in a manner such that one cancels the other.

In my system about to be described, the separate channels which are fed to the separate detecting systems are held in isolated channels until after detection is accomplished. This isolation prevents the possibility of cancellation of one signal by the other. Combination is accomplished by adding the detected outputs. In the case of frequency-shift telegraphy, the addition is accomplished by connecting the frequency discriminator and detector circuits in series. With this type of combination, the signal components of two receiver outputs add arithmetically, while the noise components add in a power relation. This stems from the fact that noise is a random accumulation of impulses which have no necessary relation to one another, and therefore do not aline or add in phase as in the case of the signal. As a result, the combination of two equal signal-to-noise ratios will so add that the sum of their signals is raised twofold or 6 db, and the sum of their noises is raised by only the $\sqrt{2}$ or 3 db.

Thus, two such equal signal-to-noise ratios, when combined will produce a resultant signal-to-noise ratio which is 3 db better than either one taken separately. This is the optimum condition of combination. In order to maintain this optimum condition of combination when the signal-to-noise ratios are different, a particular law of combination is required. That law is derived herein and may be called the "ratio-square" law.

This law states that in the optimum combination of signals which add arithmetically as to their signal voltages, and add in a power combination as to their accompanying noise, the final combination should be accomplished in such a way that the ratio of their signal strengths when being combined is squared with respect to their original received ratio.

This criterion holds for the condition of equal noise in each channel. Thus if the signal in one channel has an amplitude of one volt and the noise has an amplitude of 0.1 volt, and the signal in the other channel has an amplitude of one half volt with the noise at an amplitude of 0.1 volt, the optimum ratio of combination should be such that this 2-to-1 ratio of the signal amplitudes is squared to produce a 4-to-1 ratio. In this example, the amplitudes when being combined would therefore be one volt of signal and one-tenth volt of noise in the first channel, and 0.25 volt of signal and 0.05 volt of noise in the second channel. This would produce the optimum realization of the signal and noise power in the two channels.

In order to understand the means of accomplishing the above objective, it is desirable to derive a general relationship for determining the optimum combination of diversity signals. It will be assumed that the desired conditions are present in which the signals add as a summation of voltages and the noises add as a summation of power, and that the noise levels of the diversity channels are equal. This latter condition is readily obtained in practical diversity systems.

It is desirable to adjust diversity systems for equal noise level, rather than equal signal level, when there is appreciable difference in signal-to-noise characteristic of the channels (that is, the equipment—not the signal which may vary from instant to instant). This effect may be of importance in certain special diversity systems where there is a substantial difference in the equipment of one channel compared to another. However, in most practical diversity units the signal-to-noise characteristic of the various channels will be quite close to equality because the channels use identical equipment. Thus, in normal operation, there will be no difference between an adjustment made for equal signal levels, and one made equal noise levels.

The following analysis may be used to determine the optimum selection curve for a dual receiver diversity system. The value of a factor "X" is to be determined. This factor "X" is the factor by which the signal and noise of the weaker signal channel must be reduced. The term "reduce" is used in a relative sense. In other words, the ratio of relative gains of the stronger signal channel to the weaker channel equals "X."

The problem is to determine the optimum law of combination for two signal-to-noise ratios $S_1/N_1$ and $S_2/N_2$ for the condition of various values of signal-to-noise ratio that might obtain on the two channels.

The factor "X" by which the weaker signal and noise is to be divided, is a function of the $S_1/S_2$ ratio. The separate signals, when combined so that their signal voltages add in-phase and the noises at random, give the following output signal-to-noise ratio:

$$\frac{S}{N}=\frac{S_1+\frac{S_2}{X}}{\sqrt{N_1^2+\frac{N_2^2}{X^2}}}$$

But $$N_2=N_1$$

Therefore $$\frac{S}{N}=\frac{S_1+\frac{S_2}{X}}{\sqrt{N_1^2+\frac{N_1^2}{X^2}}}$$

$$=\frac{\frac{S_1X+S_2}{X}}{\sqrt{\frac{N_1^2X^2+N_1^2}{X^2}}}$$

$$\frac{XS_1+S_2}{N_1\sqrt{X^2+1}}$$

To find the value of X that maximizes S/N, differentiate S/N with respect to X, and set this first differential equal to zero:

$$\frac{d\frac{S}{N}}{dX}=\frac{N_1(X^2+1)^{1/2}S_1-(XS_1+S_2)\frac{N_1}{2}(X^2+1)^{-1/2}2X}{N_1^2(X^2+1)}=0$$

$$(X^2+1)S_1=(XS_1+S_2)X$$

$$X=\frac{S_1}{S_2}$$

Thus, it is seen that in order to obtain maximum S/N output in a system where the two signals are added arithmetically, and where the noise adds as the R.M.S., the weaker signal and its noise should be relatively reduced by a factor equal to the ratio of the stronger to the weaker signal. Since the weaker signal is divided by this, the actual output signal ratio is $$\frac{S_1}{\frac{S_2}{X}}=\frac{S_1X}{S_2}=\frac{(S_1)^2}{(S_2)^2}$$

The ideal system thus will square the signal input ratio, or in other words, double the amount of db difference between the two input signals. For instance, if one signal has an amplitude of two units and the other an amplitude of one unit, or a ratio of 6 db, the ideal selector should increase this ratio to 12 db. The effect of the selector is to reduce the amplitude of the weaker signal, using the stronger signal as the reference value.

If the above theory is extended to the case of a diversity system involving more than two signals, the same laws apply to a sufficient extent to allow the same type of equipment to be used. If rigorously determined, the law becames complex, but not sufficiently far away from the simple law to change the purpose as applied to triple and quadruple diversity systems. Hence, in a three channel diversity system, if the signal input ratios arrive with amplitudes of 0 db, −6 db and −8 db, the selector should increase the ratios so that the signals are combined with levels of 0 db, −12 db and −16 db. This sort of combination may be extended to any number of signals as long as the strongest signal is used as a reference, and the weaker signals are made relatively weaker by doubling each of their db differences from the strongest signal.

Referring now to the drawing, and more particularly to FIG. 1, I there show one embodiment of the invention, for two channels A and B. Variable gain amplifier 1, variable gain amplifier 8, diode 2, diode 9, common load resistor 3 and low pass filter 4, comprise a common AVC or automatic volume control system. In this system a detected D.-C. voltage appearing across resistor 3 is applied as bias to the control grids of the variable gain amplifiers, such as to hold their gains equal, and at a relatively constant value. This value will be determined by the strongest signal. If the dominant signal grows stronger, the gain is lowered. The arrangement is the same as the common automatic volume control system used in conventional diversity combination of diode detectors.

Since the gains of variable gain amplifiers 1 and 8 are held equal at the same value, the signals will have the same ratio of amplitude at the outputs of the two amplifiers, as they had at the inputs. Thus the ratio of the signals has not been changed. The only result being sought and obtained, is to maintain the level of the strongest or dominant signal at a more constant value.

Rectifier 5, low pass filter 6, and controlled amplifier 7 in channel A, together with the corresponding units 10, 11 and 12 in channel B, comprise two separate amplifying systems which perform the ratio squaring function. The signals fed to these systems are separately rectified to provide a bias voltage for each amplifier which increases each of the controlled amplifier gains as its signal level increases. In a sense, the action is somewhat the reverse of AVC. Thus, a voltage of 1 volt may be amplified with a gain of, say Y times, in which case a voltage of 2 volts would be amplified with a gain of 2Y times. Considered in a different way, if the signals in channel A and channel B have an amplitude of 1 volt and 0.5 volt respectively, the gain of the controlled amplifier 5, 6 and 7 might be, say Z times, and that of controlled amplifier 10, 11 and 12 then would be 0.5Z times. As a result the ratio of 2-to-1 would be increased to a ratio of 4-to-1, thereby presenting voltages in the ratio of 1 to 0.25 volt at the A and B outputs. This is the desired "ratio squaring" action of the present invention.

Figure 2:
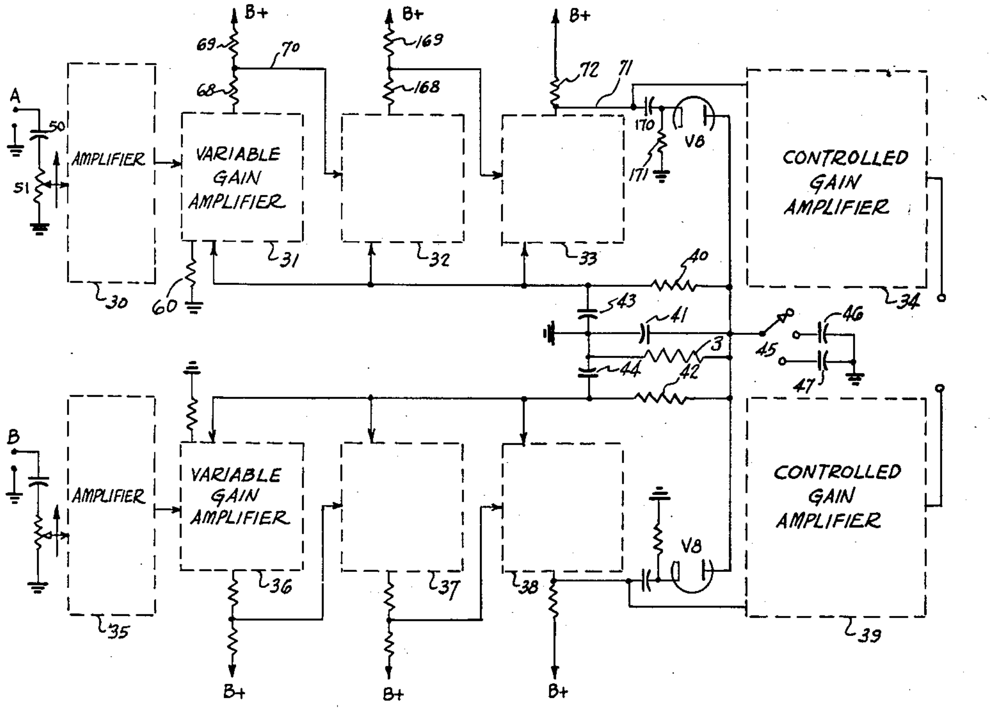
FIG. 2 is a more detailed block diagram for the same.
Figure 3:
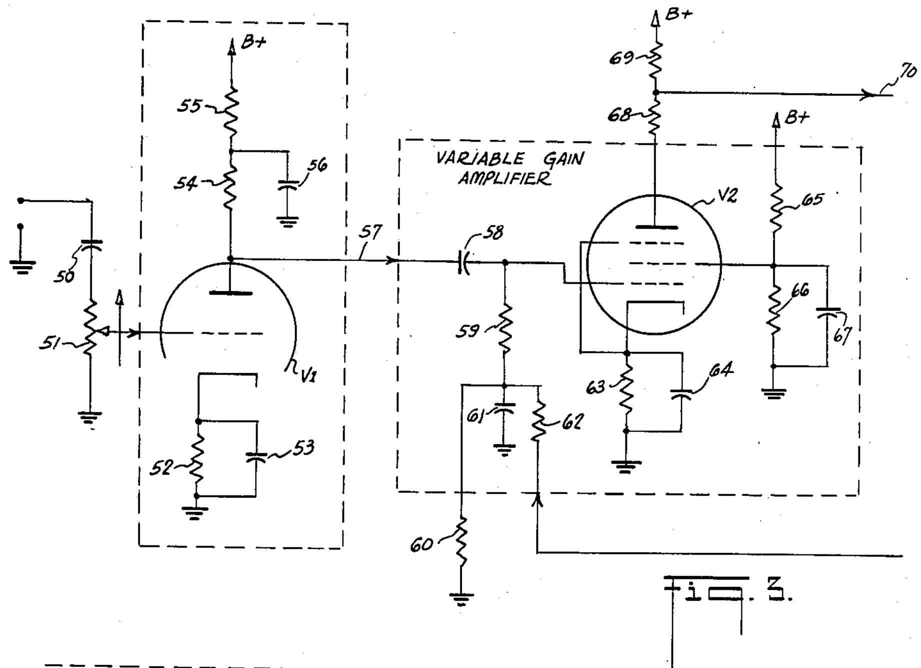
FIG. 3 is a wiring diagram for the parts contained in the left hand blocks of FIG. 2.
Figure 4:
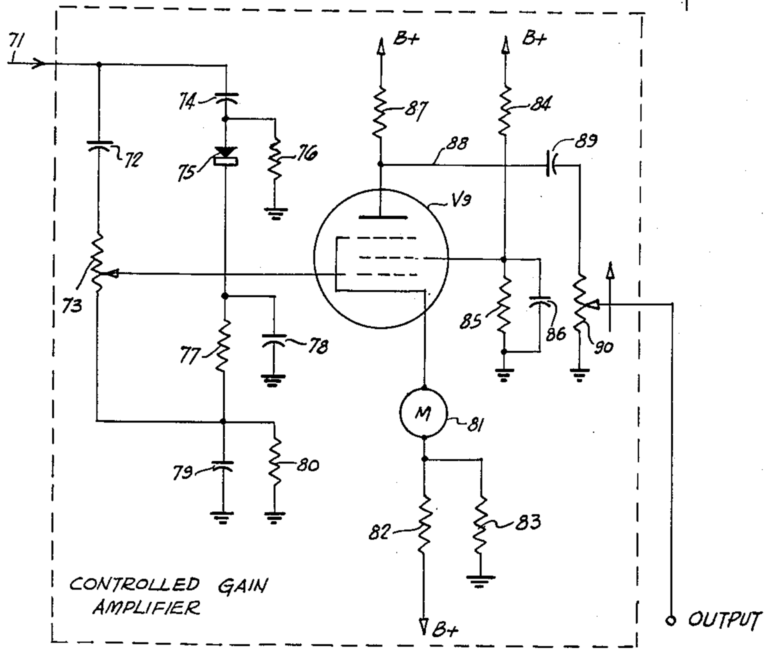
FIG. 4 is a wiring diagram for the parts contained in the righthand blocks of FIG. 2.

FIGS. 2, 3 and 4 of the drawing show the system of FIG. 1 in greater detail. Because of space limitation on the drawings, the showing in FIG. 2 is in box form, and the circuits within the boxes are shown in FIGS. 3 and 4. Input A (FIG. 2) is fed through an amplifier 30, and through three stages of variable gain amplifiers 31, 32 and 33. The tubes used in these circuits are preferably of the remote cutoff or variable gain type. The output then goes to a controlled gain amplifier 34. Input B is similarly fed through identical equipment including an amplifier 35, three stages of variable gain amplifiers 36, 37 and 38, and a controlled gain amplifier 39.

The outputs of the variable gain amplifiers are also fed to the two halves of a dual diode V8. It will be noted that the plates of the upper and lower diodes V8 are connected together and to a symmetrical circuit 40, 41, 42, 43, 44. These act as low pass filters. There is also shown a switch 45 with condensers 46 and 47 of different magnitude. The switch may be used to change the time constant of the filters. The D.C. return path for diodes V8 is through load resistor 3.

This is a volume control circuit, and the control voltage for both sets of variable gain amplifiers is derived from this common circuit. The IR drop across the common circuit is developed by whichever diode V8 is conducting at that instant. Since the plates of the diodes are connected to a common circuit the diode which is fed the stronger signal cuts off the diode which is fed the weaker signal. When the dominant signal becomes stronger, the gain is lowered, in accordance with conventional AVC practice.

The circuits within amplifier 30 (and 35), and within the variable gain amplifier 31 (and 36), are shown in FIG. 3 of the drawing. The tube V1 is one-half of a dual triode, the other half being used for the channel B amplifier 35 (FIG. 2). The input is supplied to the grid through condenser 50, and a potentiometer 51 for manual adjustment. Bias is provided by resistor 52 and condenser 53. The plate circuit includes resistors 54, 55 and condenser 56, the output being taken through conductor 57.

The variable gain amplifier centers about a pentode V2, the control grid of which is connected to a circuit consisting of condenser 58, resistors 59 and 60, and condenser 61. The automatic control connection, led back from the dual diode V8 previously referred to, is made through resistor 62.

Bias potential is supplied by resistor 63 and condenser 64. The screen grid potential is obtained through a B plus connection, and appropriate resistors 65 and 66 forming a voltage divider to ground, and a condenser 67. The plate is connected to resistors 68 and 69, with the output being supplied to the next stage through conductor 70.

The circuits for the other variable gain amplifiers 32, 33, 37 and 38 are the same as that shown in the right-hand portion of FIG. 3, there being no difference within the rectangles, and only two slight differences in the outside connections. These differences are shown in FIG. 2, where the input circuit of the first AVC stage 31 (and 36) includes a resistor 60, which stages 32 and 33 (and 37 and 38) do not have. Also the output for the third stage 33 (and 38) is taken by conductor 71 connected to one end of single resistor 72, instead of between resistors as indicated for the stages 31 and 32.

The circuits within the controlled gain amplifier box 34 (and 39) (FIG. 2) are shown in FIG. 4 of the drawing, referring to which it will be seen that the circuits center about a pentode V9, the control grid of which is connected to the output of the variable gain amplifiers through conductor 71, condenser 72, and potentiometer 73. The controlled gain amplifier derives D.C. voltage from the signal which is fed to the grid of the tube V9 and causes the $G_m$ (mutual conductance) of the tube to vary linearly with the level of the signal. The ratio of the output of the two controlled gain amplifiers 34 and 39 (FIG. 2) square the input ratio, regardless of the disparity in the strength of the received signals.

To do this the input circuit has associated with it a circuit consisting of condenser 74, rectifier 75, resistors 76, 77, condensers 78, 79, and resistor 80. The rectifier 75 here shown is a selenium rectifier, and corresponds in function to the rectifier 5 shown in FIG. 1. The lowpass filter 6 of FIG. 1 comprises in FIG. 4 the resistors 77 and 80 and condensers 78 and 79.

The cathode circuit includes a milliammeter 81, a resistor 82 leading to a source of B+ potential, and a resistor 83 connected to ground. These establish a desired positive cathode potential, corresponding to an initial negative bias on the control grid of tube V9. This initial bias is modified by the voltage drop developed across resistor 80, which voltage drop is due to rectified current flow through rectifier 75. It will be seen, due to the direction of flow of the current, that increased signal strength at conductor 71 reduces the negative bias of tube V9, thereby effectively increasing its gain. The operation is in a direction reverse to that of AVC.

The meter 81, and a corresponding meter for the other channel, are positioned close together, so that an observer can see which channel is dominant at any instant.

The screen grid potential is obtained through a B plus connection and resistor 84, the screen grid being tied to ground through a resistor 85 and condenser 86. The plate is connected to a source of anode potential through a resistor 87, and the output is taken through conductor 88, condenser 89, and potentiometer 90. It will be understood that the circuits within the controlled gain amplifier 39 (FIG. 2) for channel B, are the same as those shown in FIG. 4.

Figure 5:
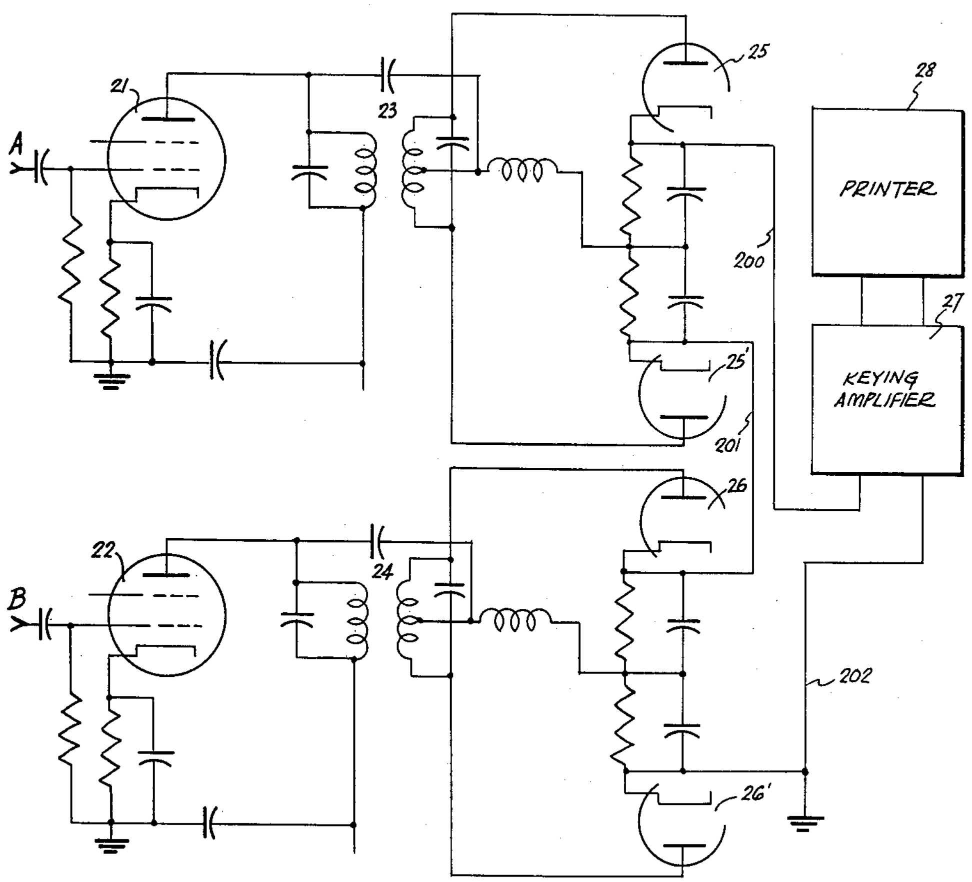
FIG. 5 is a diagram for a combining circuit for combining the outputs in a translating device.

The A output and B output of the ratio squaring circuits (shown at the right of FIG. 1 and FIG. 2) are fed to separate detectors, following which the detected outputs are combined. This may be done in a number of ways, the simplest and best of which I have found, in the case of a frequency shift telegraph system, is to connect discriminator-detector outputs in series. A circuit for this purpose is shown in FIG. 5 of the drawing, which shows a two channel system supplied from the circuits previously described, that is, the inputs to FIG. 5 may be taken from the outputs of FIG. 1 or FIG. 2. The A and B channel outputs of the ratio squaring circuits are fed to amplifiers 21 and 22, which have discriminators 23 and 24 of the Seeley type in their output circuits. These discriminators feed diode detector systems 25, 25′ and 26, 26′, which are connected in series by conductors 200, 201, and 202, with their polarities properly arranged so that their outputs add. The summation of outputs is fed to a keying amplifier 27, which may operate a "Teletype" printer 28, or other suitable translating device.

This discriminator-detector circuits of FIG. 5 have not been and need not be described in greater detail, because the circuits are of the generally conventional and well known Seeley type. The keying amplifier and printer are also conventional, and should require no further description.

In experiments with such a frequency shift telegraph system I have found that the optimum characteristic of lowpass filters 4, 6 and 11 (FIG. 1) should differ. The cutoff frequency of low pass filter 4 should be high enough to follow the noise so that the automatic volume control system will be fast enough to remove the amplitude modulation noise on the received signals. In this way an amplitude modulation rejection similar to that of a limiter is produced. The time constant of lowpass filters 6 and 11 is adjusted so as to follow only the signal variations in amplitude, and not to follow the fast variations of noise.

Thus two types of time constants are used in the gain controlling circuits. In the common AVC, obtained from diodes 2, 9 in FIG. 1 and diodes V8 in FIG. 2, the time constant is made faster than the keying speed so as to apply fast automatic volume control in the manner of a limiter. This tends to remove any amplitude modulation present on the stronger signal, so that a degree of amplitude modulation rejection is realized. The time constant in the controlled gain amplifiers (7 and 12 in FIG. 1, and 34 and 39 in FIG. 2) is adjusted to be only fast enough to follow the fading variation of the signal. The common AVC time constant may be adjusted by switch 45. If one were to adjust the controlled gain amplifier time constants faster, it would make their amplification action a square-law effect, which would be undesirable because such effect would tend to emphasize the amplitude modulation component of the noise, and would thereby tend to nullify signal-to-noise ratio gains obtained by the use of the frequency shift type of keying operation.

Figure 6:
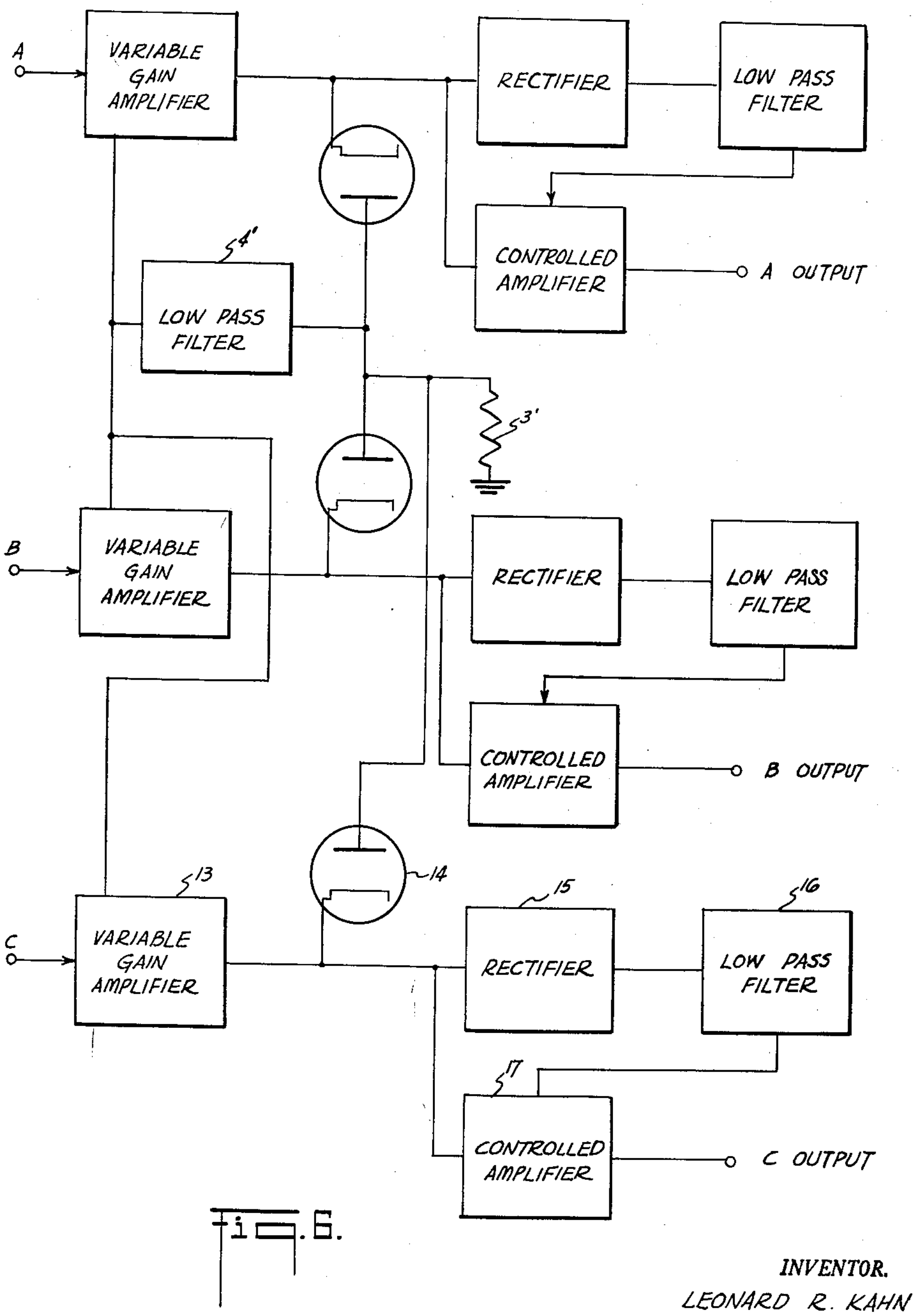
FIG. 6 is a block diagram similar to FIG. 1, but showing how the system may be applied to three (or more) channels.

As so far described the invention has been applied to a two channel diversity system. However, the invention is equally well applicable to three or more channels. FIG. 6 of the drawing is similar to FIG. 1, but shows how the invention may be applied to a diversity system having three channels, A, B and C. To add the third channel all that is required is to connect all of the diodes across the common load resistor 3′, and to arrange the variable gain amplifiers to be controlled by the D.C. output from the common lowpass filter 4′. Thus the change brought about by the addition of the third channel is to add an additional variable gain amplifier 13, diode 14, rectifier 15, lowpass filter 16, and controlled amplifier 17. The diode 14 is connected to the common automatic volume control resistor 3′. The time constants of the filter are arranged as previously explained.

Any number of additional channels may be added to increase the number of signals combined in diversity. Each one of these channel outputs feeds its own frequency discriminator and detector. All of the detectors are combined in series to feed the keying amplifier and the printer, much as was shown in FIG. 5 for the two channel system.

Figure 7:
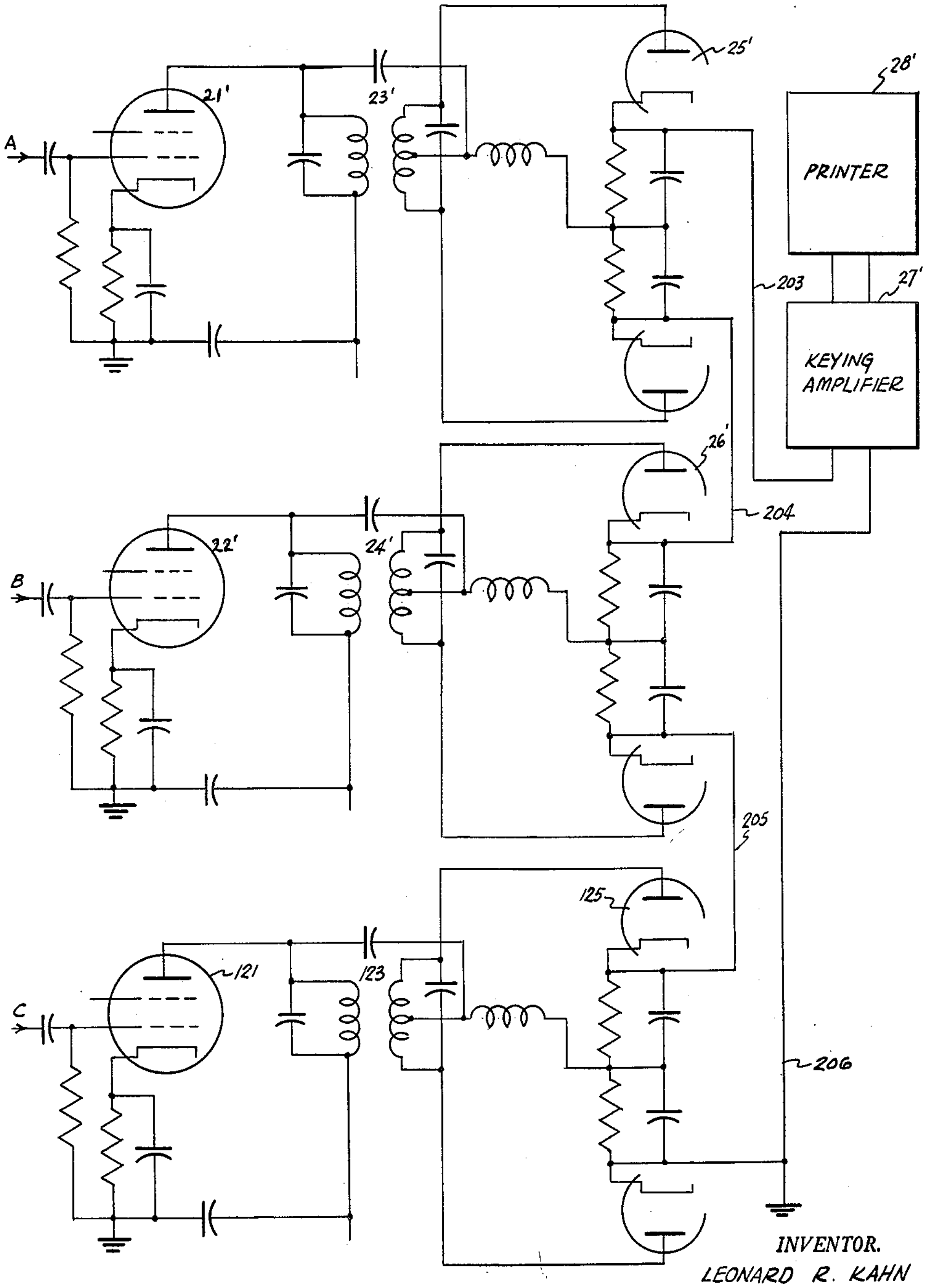
FIG. 7 is a diagram similar to FIG. 5 but showing how the invention may be applied to three (or more) channels.

The manner in which this is done for a three channel system is here shown in FIG. 7 of the drawing, which is based substantially on the circuits of FIG. 5, but with a third channel C added to the two channels A and B. In this case channel C is fed to an amplifier 121 (like amplifiers 21' and 22') which has a discriminator 123 of the Seeley type in its output circuit. This is like the discriminators 23' and 24', and it feeds a diode detector system 125, which is like the dual diode detectors 25' and 26'. This detector 125 is connected in series with the diode detector systems 25' and 26', as shown by the conductors 203, 204, 205 and 206 with the polarities properly arranged so that the outputs add, and the summation of all three outputs is fed to the keying amplifier 27' and thence to a suitable translating device, typically a "Teletype" or equivalent telegraph printer 28'.

As one specific example of quantitative values of components used in the system shown in FIGS. 2, 3 and 4 of the drawing, I may state, with reference to FIG. 3, that the condenser 50 has a value of .01 mf.; the potentiometer 51 a value of 500K ohms; the resistor 52 a value of 820 ohms; the condenser 53 a value of 5 mf.; the resistor 54 is 100K ohms; the resistor 55 is 220K ohms; and the condenser 56 is .03 mf. The tube V1 is one-half of a dual triode type 12AX7.

The tube V2 used in each of the variable gain amplifiers is a type 6BA6. The condenser 58 is .01 mf.; the resistor 59 is 27K ohms; the resistor 60 is 470K ohms; the condenser 61 is 1000 mmf.; the resistor 62 is 27K ohms; the resistor 63 is 68 ohms; the condenser 64 is 25 mf.; the resistor 65 is 20K ohms 5 w.; the resistor 66 is 12K ohms 5 w.; the condenser 67 is .1 mf.; the resistor 68 is 27K ohms; and the resistor 69 is 2700 ohms.

Reverting to FIG. 2, the resistors 168 and 169 have the same value as resistors 68 and 69. The resistor 72 has a value of 27K ohms. The diode V8 is one-half of a dual diode type 6AL5. The associated condenser 170 has a value of .01 mf.; and the resistor 171 has a value of 47K ohms. The resistors 40 and 42 have a value of 39K ohms, while the condensers 41, 43 and 44 have a value of 1000 ohms each. The condenser 46 is .01 mf., and the condenser 47 is .05 mf.

Referring now to FIG. 4 of the drawing, the condenser 72 is .02 mf.; the potentiometer 73 is 100K ohms; the condenser 74 is .02 mf.; the rectifier 75 is a selenium rectifier type Y2HP made by International Rectifier Corp. of Los Angeles, California; the resistor 76 is 100K ohms; the resistor 77 is 10K ohms; the condenser 78 is .05 mf.; the condenser 79 is .1 mf.; and the resistor 80 is 47K ohms.

The tube V9 is a type 6BC5. The meter 81 is a milliammeter having a range of 0 to 3. The resistor 82 is 25K ohms 5 w.; the resistor 83 is 330 ohms; the resistor 84 is 15K ohms; the resistor 85 is 6800 ohms 5 w.; the condenser 86 is 1.0 mf.; the resistor 87 is 22K ohms; the condenser 89 is .01 mf.; and the potentiometer 90 is 200K ohms.

The B+ voltage is assumed to be 250 volts D.C.

Reverting to FIG. 2 it will be understood that the values of the components in the apparatus for channel B are identical with the values already given for channel A. It will also be understood that the foregoing values have been given solely by way of illustration of the invention in one particular practical form, and are not intended to be in limitation of the invention.

To test the performance of the present system a tape recorder was arranged to provide two channels of recording. These two channels were fed to the diversity combining equipment, and then to the printer. The advantage of this tape recording method is that it allows the testing of each equipment on exactly the same test material. Many of the currently used diversity combining systems were tested. The present invention was found to be better than the others. In terms of a count of the errors in the printed message, it was found that the prior systems had 33% to 100% more errors than the system here disclosed.

The ratio-squaring law applies also to diversity combining of voice modulation. There is always a possibility of improvement, but never of degradation. The improvement is greatest when the multipath conditions are such that the time delays between the signals received on the separate diversity antennas are the same. Under these circumstances, the modulation frequencies add in phase. If there is substantial time delay between the signals received on the separate diversity antennas, only the lower modulation frequencies add in-phase. The higher modulation frequencies tend to be in random phase, and a new fading pattern may be produced for higher modulation frequencies, but no damage is done. Consequently, a certain amount of overall improvement is obtainable.

It is believed that the method and apparatus of my diversity system, as well as the advantages thereof, will be apparent from the foregoing detailed description. The system has the advantage that there are no switching transients and no cancellation points. The system is insensitive to the frequency of the channels being combined, and therefore either a common frequency may be employed, or different frequencies, for the diversity system. The invention is applicable to diversity systems having two, three or more channels. These advantages are all in addition to the primary advantage arising from the great improvement in the signal-to-noise ratio obtained by following the ratio squaring law which is explained above, and which underlies the invention.

It will be understood that while I have shown and described my invention in a preferred form, changes may be made in the circuits shown, without departing from the scope of the invention, as sought to be defined in the following claims.

This application is a continuation of my copending and now abandoned application Serial No. 365,964, filed July 3, 1953, and entitled Diversity Receiving System.

What is claimed is:

1. A diversity receiving system comprising a plurality of amplifiers, one for each diversity channel, and a plurality of envelope detectors operative to produce in-phase outputs, there being one such detector following each amplifier, means for controlling the relative gains of the amplifiers, said gain control means being operative to cause a squaring of the ratio of the input signal levels at the amplifier outputs, and means connecting the detected outputs to summate the signal voltages in-phase.

2. A diversity receiving system for the reception of frequency shift keying signals, said system comprising a plurality of amplifiers, one for each diversity channel, a discriminator-detector following each amplifier, means for controlling the relative gains of the amplifiers, said means being operative to effect a squaring of the ratios of the input signal levels at the amplifier outputs, and means for connecting the discriminator-detector outputs in series to summate the detected signals in-phase.

3. A diversity receiving system for the reception of frequency shift keying signals, said system comprising a plurality of AVC amplifiers, one for each channel, a common automatic volume control means for controlling said AVC amplifiers in common, a plurality of additional carrier amplifiers, one for each channel, gain control means for said additional carrier amplifiers, said means being arranged to cause squaring of the ratios of the input signal levels at the outputs of said additional amplifiers, a plurality of envelope detectors, one for each channel, following said additional amplifiers, and means connecting the detector outputs in series to summate the detected signals in-phase.

4. A diversity receiving system comprising a plurality of controlled carrier amplifiers, one for each channel, a gain control means including a rectifier and a lowpass filter for each of said controlled amplifiers, said gain control means serving to relatively reduce the amplification of the weaker signals only enough to double the decibel ratios of the strongest signal to each of the weaker signals, a plurality of phase insensitive detectors, one for each channel, following said controlled amplifiers, and means combining the outputs of said detectors in series to summate the detected signals in-phase.

5. A diversity receiving system for frequency shift keying comprising a plurality of controlled amplifiers one for each channel, a gain control means including a rectifier and a lowpass filter for each of said controlled amplifiers, said lowpass filters being selected to follow the signal variations in amplitude but not to follow fast variations of noise, said gain control means serving to relatively reduce the amplification of the weaker signals enough to double the decibel ratios of the strongest signal to each of the weaker signals, a plurality of phase insensitive detectors, one for each channel, following said controlled amplifiers, and means combining the outputs of said detectors in series for supply to a translating device to summate the detected signals in-phase and add the noise in random phase relation.

6. A diversity receiving system comprising a plurality of variable gain amplifiers, one for each diversity channel, an automatic volume control system for said amplifiers, a plurality of controlled amplifiers, one for each channel, a gain control means including a rectifier and a lowpass filter for each of said controlled amplifiers, said gain control means serving to relatively reduce the amplification of the weaker signals only enough to double the decibel ratios of the strongest signal to each of the weaker signals, a plurality of envelope detectors, one for each channel, following said controlled amplifiers, and means combining the outputs of said detectors in series to summate the detected signals in-phase.

7. A diversity receiving system for frequency shift keying comprising a plurality of variable gain amplifiers, one for each diversity channel, an automatic volume control system for said amplifiers, said system including a lowpass filter having a cutoff frequency high enough to follow noise and thus to provide a limiting action, a plurality of controlled amplifiers, one for each channel, a gain control means including a rectifier and a lowpass filter for each of said controlled amplifiers, said lowpass filters being selected to follow the signal variations in amplitude but not to follow fast variations of noise, said gain control means serving to relatively reduce the amplification of the weaker signals only enough to double the decibel ratios of the strongest signal to each of the weaker signals, a plurality of envelope detectors, one for each channel, following said controlled amplifiers, and means combining the outputs of said detectors in series for supply to a translating device to summate the detected signals in-phase and add the noise in random phase relation.

8. A diversity receiving system for the reception of frequency shift keying signals, said system comprising an amplifier for each channel, a common automatic volume control means for controlling said amplifiers in common in accordance with the dominant signal so as to reduce the gain when the dominant signal increases in strength, said common automatic volume control means including a lowpass filter the time constant of which is made faster than the keying speed, an additional carrier amplifier for each channel, independent gain control means for each of said additional amplifiers and so arranged as to increase the gain when the signal strength increases, each of said gain control means including a lowpass filter the time constant of which is so adjusted as to follow only the fading variations in amplitude, the value of the circuit components in said independent gain control means maintaining the stronger signal strength output greater than the weaker signal strength output by a factor equal to the square of the ratio of their respective input strengths, a discriminator-detector for each channel following said additional amplifier, and means connecting the detector outputs in series to summate the signal voltages in-phase.

9. A diversity receiving system for the reception of frequency shift keying signals, said system comprising an amplifier for each channel, a common automatic volume control means for controlling said amplifiers in common in accordance with the dominant signal so as to reduce the gain when the dominant signal increases in strength, said common automatic volume control means including a lowpass filter the cutoff frequency of which is high enough to follow the noise so as to remove the amplitude modulation noise, an additional carrier amplifier for each channel, independent gain control means for each of said additional amplifiers and so arranged as to increase the gain when the signal strength increases, in linear fashion, and regardless of the disparity in the strength of the signals received over the different channels, each of said gain control means including a lowpass filter the cutoff frequency of which is so adjusted as to follow only the signal variations in amplitude and not to follow the fast variations of noise, the value of the circuit components in said independent gain control means maintaining the stronger signal strength output greater than the weaker signal strength output by a factor equal to the square of the ratio of their respective input strengths, a phase insensitive detector for each channel following said additional amplifier and means connecting the detector outputs in series to summate the signal voltages in-phase and add the noise in random phase relation.

10. A diversity receiving system for the reception of frequency shift keying signals, said system comprising a plurality of variable gain amplifiers, one for each diversity channel, an automatic volume control system for varying the gain of said amplifiers in common in accordance with the dominant signals so as to reduce the gain when the dominant signal increases in strength, said system including a common lowpass filter having a cutoff frequency high enough to follow noise so as to remove the amplitude modulated noise, a plurality of controlled carrier amplifiers, one for each diversity channel, independent gain control means including a rectifier and a lowpass filter for each of said controlled amplifiers, said lowpass filters being selected to follow the signal variations in amplitude but not to follow fast variations of noise, said gain control means being arranged to cause the ratios of the signal levels at the outputs of said controlled amplifiers to be proportional to the square of the input signal levels regardless of the disparity in strength of the signals received over the different diversity channels, a plurality of phase insensitive detectors, one for each channel, following said controlled amplifiers, and means connecting the detector outputs in series to summate the signal voltages in-phase and add the noise in random phase relation.

11. A multi-channel signal diversity receiving system adapted to effect optimum signal-to-noise ratio comprising means for amplifying a plurality of received diversity signals in a plurality of channels respectively, means for comparing the signal levels in said plurality of channels prior to said signal amplification thereby to determine the input ratio of the relatively stronger to the relatively weaker signal in a pair of said channels, means for reducing the gain, and thereby both the signal and noise level, in the weaker one of said pair of channels in accordance with the signal level ratio determined by said comparison means to produce an output signal level ratio in said pair of channels, subsequent to amplification of said signals, which is the square of said input ratio, and means for effecting substantially in-phase summation of signals in said pair of channels sometime prior to final utilization of said signals.

12. The structure of claim 11 including means for detecting said signals subsequent to said signal amplification, said in-phase summation means being coupled to the outputs of said detecting means.

13. A diversity receiving system for treating plural signals, promulgated through a plurality of channels from a plurality of input points to a final utilization point, thereby to obtain a maximal signal to noise ratio at said final utilization point, each of said channels including means for amplifying signals therein sometime during promulgation of said signals therein toward said final utilization point, and each of said channels also including means for detecting signals therein sometime during promulgation of said signals therein toward said final utilization point, comprising means for comparing the signal levels in said plurality of channels prior to said signal amplification in said channels thereby to determine a preamplification signal ratio in said plurality of channels, means responsive to said comparing means for controlling the amplification of signals in at least one of said channels to effect a post-amplification signal ratio in a pair of said channels which is the square of the pre-amplification signal ratio in said pair of channels, said controlling means including means reducing both the signal and noise level in the relatively weaker one of said pair of channels by said pre-amplification signal ratio while maintaining both the signal and noise level in the relatively stronger one of said pair of channels substantially at a predetermined level, and means effecting substantially in-phase summation of signals in said pair of channels sometime prior to appearance of signals at said final utilization point whereby a signal appearing at said final utilization point comprises a composite signal resulting from both an in-phase summation and a ratio squaring of signals previously appearing in a plurality of channels.

14. The structure of claim 13 wherein said in-phase summation means is coupled to the outputs of said detecting means in said plurality of channels.

15. A diversity receiving system adapted to obtain optimum signal-to-noise ratio comprising means for amplifying a pair of received signals in a pair of separate amplifying channels, means for comparing said signals to determine which is the weaker thereof as well as to determine the ratio of the stronger to the weaker signal, means for reducing the weaker signal and its noise during said signal amplification by a factor equal to the ratio of the stronger to the weaker signal, and means for adding the thus altered ratio signals in-phase subsequent to said signal amplification.

16. A diversity receiving system adapted to obtain optimum signal-to-noise ratio comprising means for amplifying a pair of received radiant energy transmissions in a pair of separate amplifying channels, the energy in one of said channels having a stronger signal level than the signal level in the energy of the other of said channels, means responsive to comparable portions of the energies being amplified in said pair of channels for determining the ratio of the stronger to the weaker signal in said pair of channels, means for relatively reducing the gain of the amplifying channel associated with the weaker one of said signals by a factor equal to the determined ratio of stronger to weaker signal, and means for adding the thus altered ratio signals in-phase.

References Cited in the file of this patent

UNITED STATES PATENTS

| | | |
|---|---|---|
| 2,219,749 | Oswald | Oct. 29, 1940 |
| 2,302,951 | Peterson | Nov. 24, 1942 |
| 2,472,301 | Koch | June 7, 1949 |
| 2,604,587 | Lyons | July 22, 1952 |